United States Patent [19]

Fujiwara

[11] Patent Number: 4,668,010
[45] Date of Patent: May 26, 1987

[54] SEAT WITH ARMRESTS ADAPTED TO SUPPORT TRAY

[75] Inventor: Mikio Fujiwara, Kanagawa, Japan

[73] Assignee: Ikeda Bussan Co., Ltd., Ayase, Japan

[21] Appl. No.: 819,640

[22] Filed: Jan. 17, 1986

[30] Foreign Application Priority Data

Feb. 26, 1985 [JP] Japan .................. 60-26967[U]
May 31, 1985 [JP] Japan .................. 60-82242[U]
May 31, 1985 [JP] Japan .................. 60-82243[U]

[51] Int. Cl.$^4$ .............................. A47B 83/02
[52] U.S. Cl. ................... 297/150; 297/153; 297/154; 297/191; 297/417
[58] Field of Search ............... 297/150–155, 297/191, 417

[56] References Cited

U.S. PATENT DOCUMENTS

| 697,372 | 4/1902 | Smitz | 297/153 |
| 1,371,475 | 3/1921 | Ernst | 297/155 |
| 2,274,506 | 2/1942 | Streit | 297/150 X |
| 2,701,006 | 2/1955 | Kandarian | 297/150 |
| 3,140,119 | 7/1964 | Offner | 297/417 |
| 3,544,163 | 12/1970 | Krein | 297/417 |
| 3,606,449 | 9/1971 | Whybrew et al. | 297/417 X |
| 3,767,260 | 10/1973 | Limpach | 297/417 |
| 3,807,799 | 4/1974 | Freedman | 297/417 |
| 3,909,063 | 9/1975 | Bonisch et al. | 297/417 X |

FOREIGN PATENT DOCUMENTS 58-180731 12/1983 Japan .

*Primary Examiner*—Francis K. Zugel
*Attorney, Agent, or Firm*—Schwartz, Jeffery, Schwaab, Mack, Blumenthal & Evans

[57] ABSTRACT

Herein disclosed is an improved seat having a detachable tray member which is formed with spaced outward flanges. The seat comprises a seat cushion, a seatback mounted on the seat cushion and a pair of armrest units respectively mounted to both sides of the seatback. At least one part of each unit is formed at its inboard side with a straight groove. The parts of the paired armrest units are moved, when the units assume one given condition, to a position behind the seatback to hold the tray member having the outward flanges received in the grooves.

7 Claims, 13 Drawing Figures

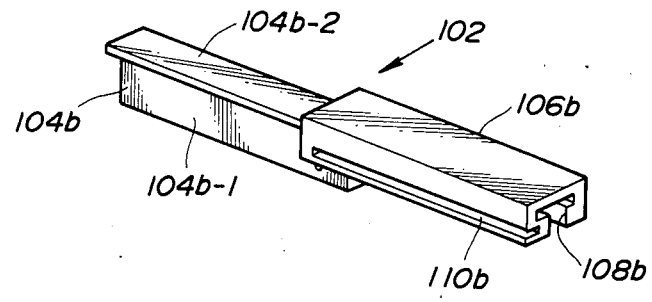
FIG.11
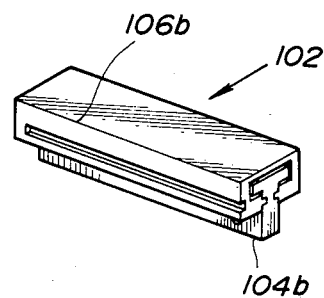
FIG.12
FIG.13
(PRIOR ART)
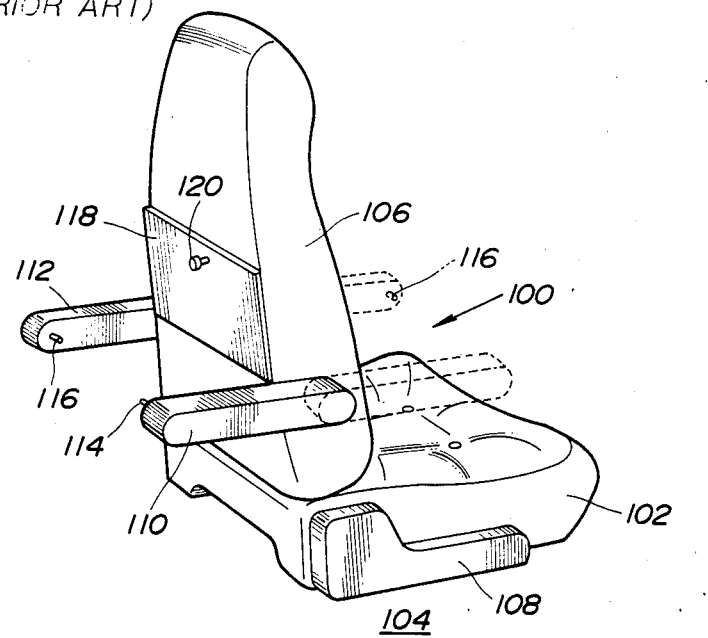

SEAT WITH ARMRESTS ADAPTED TO SUPPORT TRAY

BACKGROUND OF THE INVENTION

1. Field of the Invention

The present invention relates in general to a seat, and more particularly to an automotive seat having a pair of armrests which can be used for supporting a tray member for use of a passenger seated behind the seat.

2. Description of the Prior Art

Hitherto, various kinds of armrest-mounted seats have been proposed and put into practical use particularly in the automotive field. Some of them are of a type wherein the armrests can be pivoted backward to a position behind the seatback to support thereon a tray member for use of a passenger seated behind the seat. However, as will be described hereinafter, some of the seats of such type have several drawbacks due to their inherent constructions.

SUMMARY OF THE INVENTION

It is therefore an object of the present invention to provide an improved seat which is free of the drawbacks which have been encountered in the conventional seats.

According to the present invention, there is provided a seat having a detachable tray member which is formed with spaced outward flanges, the seat comprising a seat cushion, a seatback mounted on the seat cushion, a pair of armrest units respectively mounted to both sides of the seatback, at least one part of each unit being formed at its inboard side with a straight groove, the parts of the paired armrest units being moved, when the units assume one given condition, to a position behind the seatback to hold the tray member having the outward flanges received in the grooves and a tray holding device mounted on the back side of the seatback to hold the tray member.

BRIEF DESCRIPTION OF THE DRAWINGS

Other objects and advantages of the present invention will become apparent from the following description when taken in conjunction with the accompanying drawings, in which:

FIG. 11 is a perspective view of a modification of the armrest unit of the third embodiment in a condition wherein a tray supporting part thereof is slided backward from the base member of the same;

FIG. 12 is a perspective view of the modification of FIG. 11, but showing a condition wherein the tray supporting part thereof is placed on the base member; and FIG. 13 is a perspective view of a conventional seat.

DESCRITION OF THE CONVENTIONAL SEAT

Figure 1:
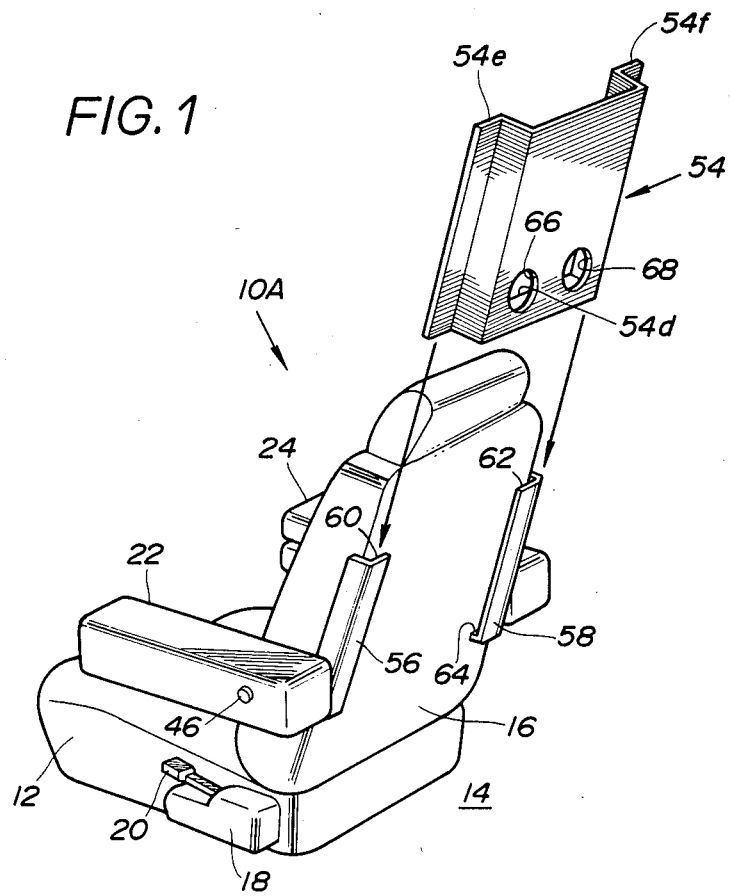
FIG. 1 is a perspective view of a seat of a first embodiment of the present invention, showing a pair of armrest units in their regular positions.
Figure 2:
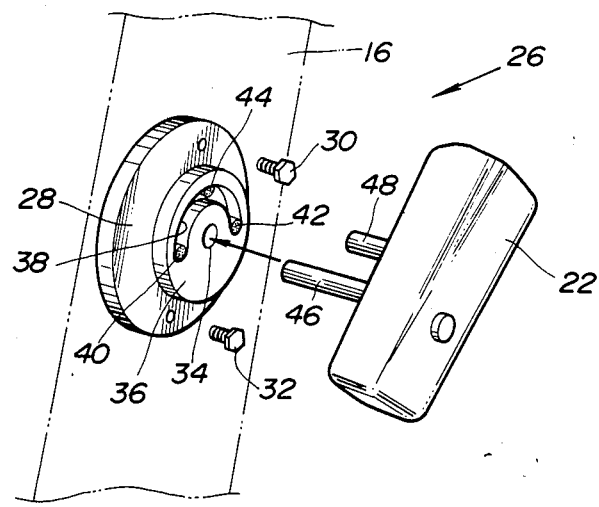
FIG. 2 is an exploded and enlarged view of a pivoting device employed in the first embodiment for achieving a pivoting movement of each armrest unit relative to a backrest of the seat.

Prior to describing in detail the invention, one conventional seat of the type as mentioned hereinabove will be described with reference to FIG. 13 in order to clarify the task of the invention.

Referring to FIG. 13, there is shown the conventional seat 100 which is disclosed in Japanese Utility Model First Provisional Publication No. 58-180731.

The seat 100 comprises a seat cushion 102 mounted on a vehicle floor 104 through a known seat sliding mechanism (not shown), and a seat back 106 pivotally mounted on a rear part of the seat cushion 102 through a known reclining device 108. A pair of armrests 110 and 112 are pivotally connected at their one ends to side portions of the seat back 106, so that they are pivotal from their front positions as shown by broken lines to their rear positions as shown by solid lines. Although not shown in the drawing, suitable stoppers are arranged to hold the armrests 110 and 112 at the front and rear positions, respectively. As shown in the drawing, the leading or free end of each armrest 110 or 112 is equipped at the inboard side with a pin 114 or 116. The pins 114 and 116 are so arranged that when certain external force is applied to them, they are slided into associated bores (no numerals) formed in the armrests 110 and 112 and held in the bores until they are forced to be drawn therefrom manually. A table plate or tray member 118 is pivotally connected at its lower end to the back side of the seatback 106 through known hinge means. A knob 120 is fixed to the free end of the tray member 118. Although not shown, suitable holding means, such as hook-and-eye fastener, is arranged to hold the tray member 118 in the illustrated rest position.

Usually, the armrests 110 and 112 assume their front positions as shown by the broken lines wherein they serve as the substantial armrests for a passenger seated on the seat 100. Upon requirement of practical use of the tray member 118, the two armrests 110 and 112 are turned backward to assume their rear positions as shown by the solid lines and the pins 114 and 116 are pulled out manually. Then, the tray member 118 is pulled down from the rest position. With this, the tray member 118 is held substantially horizontal by the pins 114 and 116 so as to serve as a table for a passenger seated behind the seat 100.

However, due to its inherent construction, the above-mentioned conventional seat 100 has the following drawbacks.

First, there is a possibility that the armrests 110 and 112 are turned rearward or forward with the pins 114 and 116 being projected. This is very undesirable and damage the dangerous because the projected pins 114 and 116 may seat back 106 and injure the passengers.

Second, under the rest of the tray member 118, it is held to cover the major part of the back side of the seatback 106. Thus, it is impossible or at least difficult to provide the seatback 106 with a conventional pocket into which some percels are put.

DETAILED DESCRIPTION OF THE INVENTION

In the following, some of seats according to the present invention will be described with reference to the drawings, which seats are free of the above-mentioned drawbacks.

Referring to FIGS. 1 to 4, particularly FIG. 1, there is shown a first embodiment of the present invention. The seat 10A of this embodiment comprises a seat cushion 12 mounted on a vehicle floor 14 through a known seat sliding mechanism (not shown), and a seatback 16 pivotally mounted on a rear part of the seat cushion 12 through a known seat reclining device 18. Denoted by numeral 20 is a handle of the reclining device 18.

Figure 3:
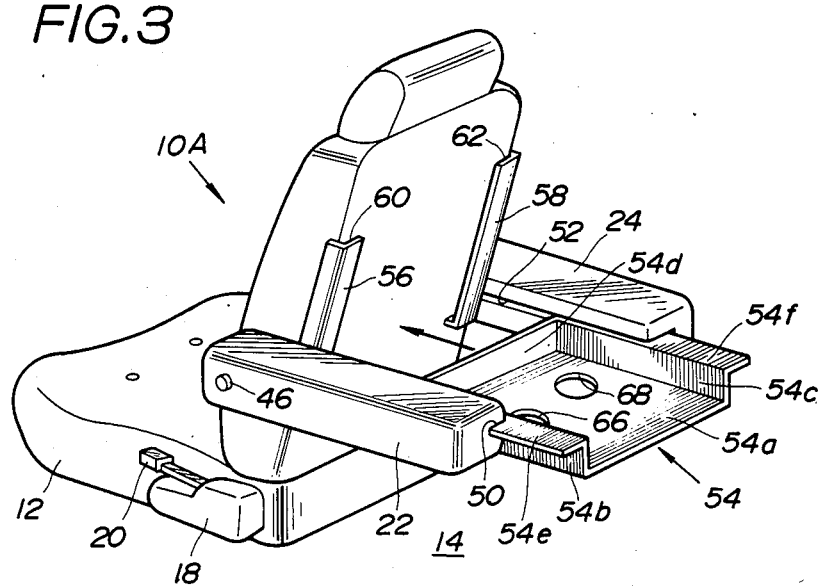
FIG. 3 is a perspective view of the seat of the first embodiment, showing the armrest units turned backward for supporting a tray member.
Figure 4:
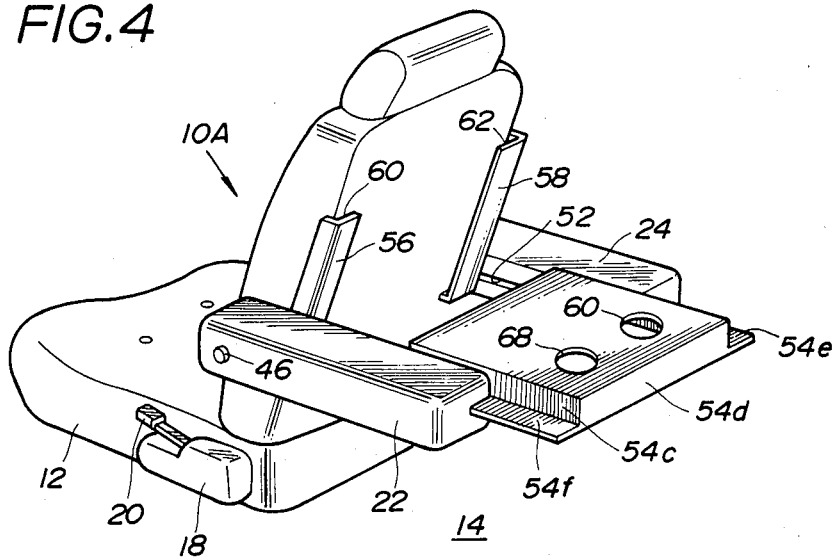
FIG. 4 is a view similar to FIG. 3, but showing the tray member set upside down by the armrest units.

A pair of armrest units 22 and 24 are pivotally connected at their one ends to both sides of the seatback 16 through respective pivoting devices 26, so that the armrest units 22 and 24 are pivotal from their front positions as shown in FIG. 1 to their rear positions as shown in FIG. 3 and vice versa.

As these two pivoting devices 26 have substantially the same construction, only the device associated with the armrest 22 will be described hereinnext.

The pivoting device 26 comprises a circular base plate 28 secured to one side of the seatback 16 by bolts 30 and 32. The base plate 28 is formed with a through hole 34 and integrally formed with a circular stage 36 which is concentric with the hole 34. The stage 36 is formed with an arcuate groove 38 which extends concentrically about the hole 34 by approximately 180 degrees. Each end of the groove 38 is equipped with a rubber block 40 or 42, and the middle portion of the groove 38 is equipped with another rubber block 44.

The pivoting device 26 further comprises a pivot shaft 46 fixed to one end of the armrest unit 22, and a guide pin 48 fixed to the armrest unit 22 near the pivot shaft 46. Upon assembly, the pivot shaft 46 is received in the through hole 34 and the guide pin 48 is received in the arcuate groove 38, so that the armrest unit 22 can turn about the axis of the pivot shaft 46 between the front position (see FIG. 1) wherein the guide pin 48 is in contact with and supported by the rubber block 40 and the rear position (see FIG. 3) wherein the guide pin 48 is in contact with and supported by the block 42. The rubber block 44 functions to temporally hold the guide pin 48 and thus the armrest unit 22 at their upright positions wherein the armrest unit 22 extends upward along the side of the seatback 16. Although not shown in the drawing, a suitable connector is associated with the pivot shaft 46 to prevent disconnection of the same from the through hole 34.

As will be seen from FIG. 3, the paired armrest units 22 and 24 are formed at their inboard sides with straight grooves 50 and 52 each extending from the free end of the armrest 22 or 24 to a portion near the pivoted end of the same. Slidably engaged with the grooves 50 and 52 is a tray member 54 which comprises a rectangular flat major portion 54a, side walls 54b and 54c formed on the opposed sides of the major portion 54a, and an end wall 54d formed on one end of the major portion 54a. As is best seen from FIG. 3, the side walls 54b and 54c are respectively formed with outward flanges 54e and 54f. The flanges 54e and 54f are constructed and sized to be slidably received in the grooves 50 and 52 of the paired armrest units 22 and 24.

As is well seen from FIG. 1, the back side of the seatback 16 is equipped at the laterally opposed portions with respective elongate holding members 56 and 58 each having a generally L-shaped cross-section. Each holding member 56 or 58 extends along the ridge defined between the back side of the seatback 16 and one side portion of the same and is secured to the seatback 16 in a manner to define a certain clearance 60 or 62 between one wall portion thereof and the back side of the seatback 16, as shown. The lower end of each guide member 56 or 58 is bent toward the seatback 16 to form a stopper 64 (only one is shown in FIG. 1). It is to be noted that the two guide members 56 and 58 are spaced and constructed to slidably receive in the spaced clearances 60 and 62 the outward flanges 54e and 54f of the tray member 54.

When, with the construction as described hereinabove, the seat 10A is in its normal condition, the armrest units 22 and 24 assume their front positions and the tray member 54 is held by the holding members 56 and 58 with the end wall 54d thereof facing downward, as will be understood from FIG. 1. Thus, in this condition, the tray member 54 can serve as a parcel pocket for holding magazines, papers or the like. Of course, the armrest units 22 and 24 serve as "armrests" practically.

When, now, a table is required by a rear seat passenger, the two armrest units 22 and 24 are turned back to their rear positions as shown in FIG. 3, and the tray member 54 is drawn out from the holding members 56 and 58 and put into the grooves 50 and 52 of the armrest units 22 and 24 with the end wall 54d facing the back side of the seatback 16. With these steps, the tray member 54 can serve as a substantial table for the rear seat passenger. It is to be noted that circular openings 66 and 68 formed in the tray member 54 are used for standing bottled and canned drinks or the like. If desired, the tray member 54 may be set upside down as is seen from FIG. 4. In this condition, the effective service area of the table is increased by the degree corresponding to that of the upper surfaces of the two armrest units 22 and 24.

Figure 5:
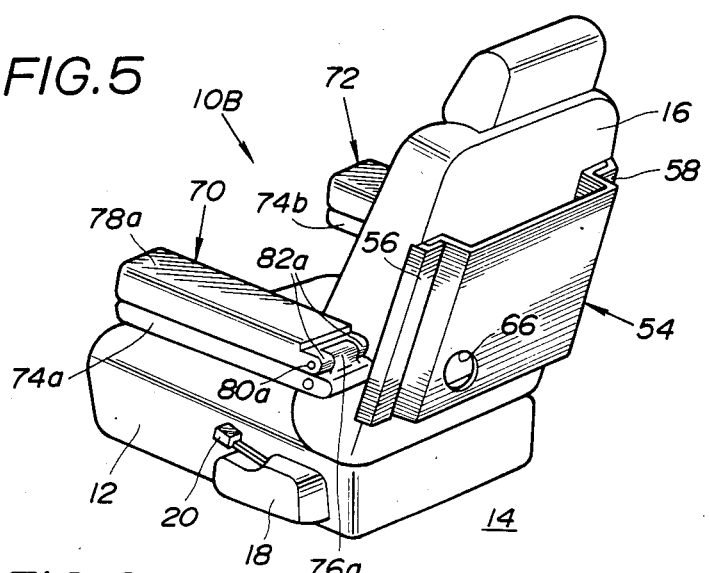
FIG. 5 is a perspective view of a seat of a second embodiment of the present invention, showing a pair of armrest units in their regular positions.
Figure 6:
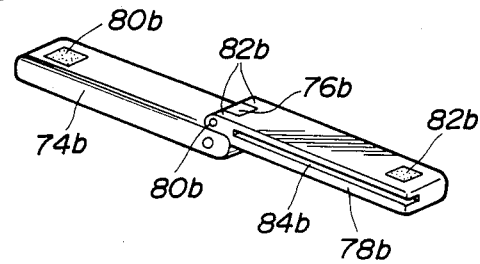
FIG. 6 is a perspective view of one armrest unit employed in the second embodiment, showing a tray supporting part thereof turned backward.
Figure 7:
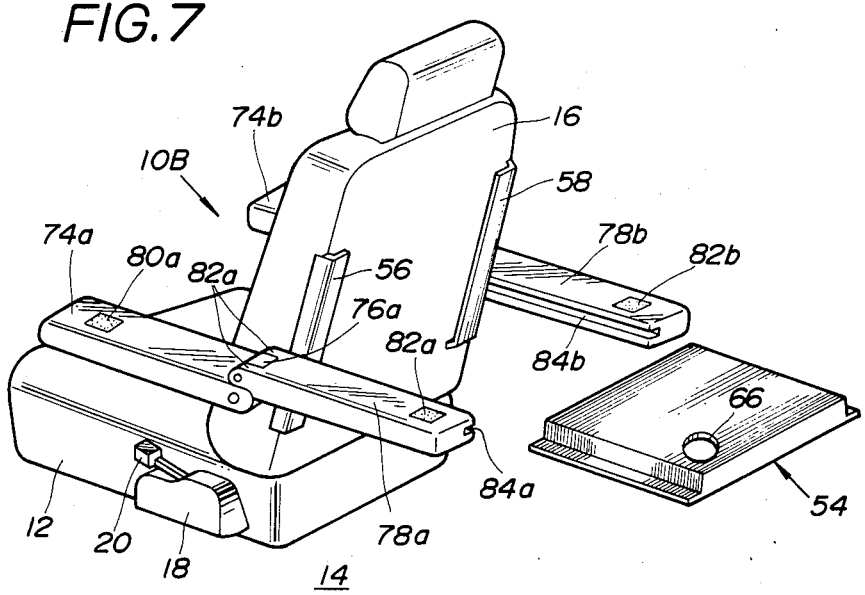
FIG. 7 is a perspective view of the seat of the second embodiment, showing the tray supporting parts of the paired armrest units turned backward for supporting a tray member.

Referring to FIGS. 5 to 7, particularly FIG. 5, there is shown a second embodiment of the present invention. The seat 10B of this embodiment comprises a seat cushion 12, a seat sliding mechanism (not shown), a seatback 16 and a seat reclining device 18 which are assembled in the same manner as that described in the first embodiment. To the back side of the seatback 16, there are fixed two elongate holding members 56 and 58 to hold the tray member 54, like in the case of the afore-mentioned first embodiment.

A pair of armrest units 70 and 72 are connected to both sides of the seatback 16. The two armrest units have substantially the same constructions. In the drawings, the parts of the armrest unit 70 will be indicated by the addition of the reference "a" after each numeral while those of the other armrest unit 72 will be indicated by the addition of the reference "b" after each corresponding numeral. Each of the armrest units 70 and 72 comprises an elongate base member 74a or 74b which is securely connected at the rear portion thereof to one side of the seatback 16 and extends forward. The rear portion of each base member 74a or 74b is formed with a projection 76a or 76b. Elongate pivotal members 78a are pivotally connected at their one ends to the projections 76a or 76b through pivot pins 80a or 80b. For this pivotal connection, each pivotal member 78a or 78b is formed with spaced lugs 82a or 82b which put therebetween the projection 76a or 76b of the base member 74a or 74b, as is seen from FIG. 5. Each pivotal member 78a or 78b is sized to cover the corresponding base member 74a or 74b when put on the same. Thus, it will be appreciated that each pivotal member 78a or 78b is pivotal about the pin 80a from the front position as shown in FIG. 5 to the rear position as shown in FIG. 7, and vice versa. As is seen from FIG. 6, a pair of elements 80a or 80b and 82a or 82b of a suitable fastener, such as a hook-and-eye fabric fastener "VELCRO" (trade name), or the like are attached to suitable portions of the base member 74a or 74b and the pivotal member 78a or 78b, respectively, so that upon folding of the pivotal member 78a or 78b onto the base member 74a or 74b, these two members are fastened but weakly.

As will be seen from FIG. 7, the pivotal members 78a and 78b are formed at their inboard sides with straight grooves 84a and 84b each extending from the free end of the pivotal member 78a or 78b to a portion near the pivoted end of the same.

When, with the construction as described hereinabove, the seat 10B is in its normal condition, the pivotal members 78a and 78b are placed on the corresponding base members 74a and 74b and the tray member 54 is held by the holding members 56 and 58, as is seen in FIG. 5. Thus, in this condition, the armrest units 70 and 72 serve as the substantial armrests and the tray member 54 serves as a parcel pocket.

When a table is required by a rear seat passenger, the pivotal members 78a and 78b are turned back to their rear positions as shown in FIG. 7, and the tray member 54 is drawn out from the holding members 56 and 58 and put into the grooves 84a and 84b of the pivotal members 78a and 78b. With these steps, the tray member 54 can serve as a substantial table for the rear seat passenger. It is to be noted that the elongate base members 74a and 74b remained in the original positions now serve as "armrests" practically.

Figure 8:
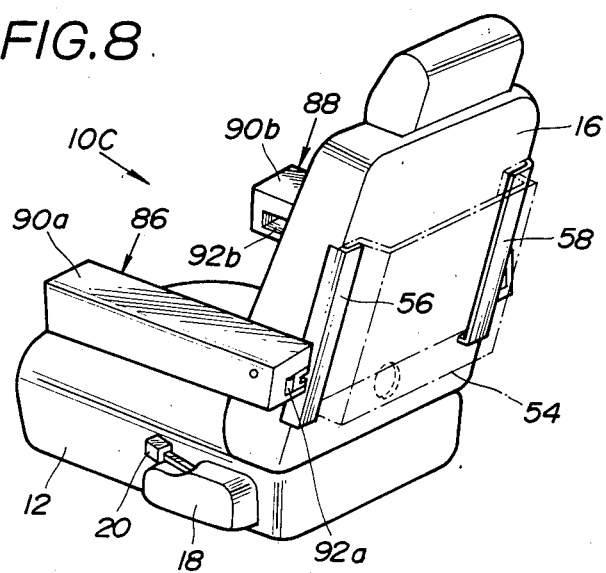
FIG. 8 is a perspective view of a seat of a third embodiment of the present invention, showing a pair of armrest units in their regular positions.
Figure 9:
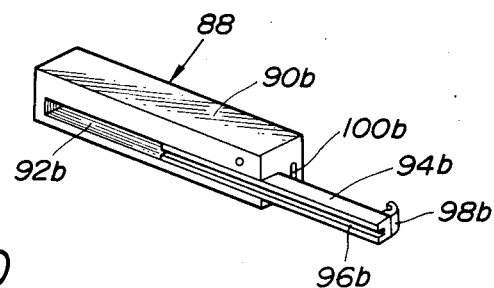
FIG. 9 is a perspective view of one armrest unit employed in the third embodiment, showing a tray supporting part thereof drawn slightly from the armrest proper.
Figure 10:
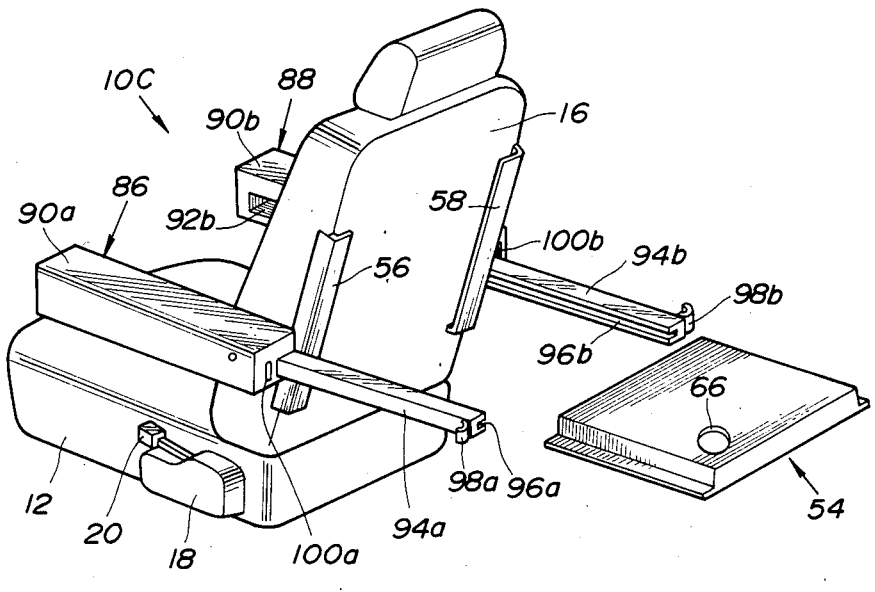
FIG. 10 is a perspective view of the seat of the third embodiment, showing the tray supporting parts of the paired armrest units drawn fully from the armrests proper for supporting a tray member.

Referring to FIGS. 8 to 10, particularly FIG. 8, there is shown a third embodiment of the present invention. The seat 10C of this embodiment comprises a seat cushion 12, a seat sliding mechanism (not shown), a seatback 16, and a seat reclining device 18 which are assembled in the same manner as that described in the first embodiment. To the back side of the seatback 16, there are fixed two elongate holding members 56 and 58 to hold the tray member 54, like in the case of the afore-mentioned first embodiment.

A pair of armrest units 86 and 88 are mounted to both sides of the seatback 16. The two units 86 and 88 have substantially the same constructions. In the drawings and the following description, the parts of the armrest unit 86 will be indicated by the addition of the reference "a" after each numeral while those of the other armrest unit 88 will be indicated by the addition of the reference "b" after each corresponding numeral. Each of the armrest units 86 and 88 comprises an elongate base member 90a or 90b which is securely connected at the rear portion thereof to one side of the seatback 16 and extends forward. The inboard sides of the base members 90a and 90b are respectively formed with straight grooves 92a and 92b, each extending from the rear end of the base member to a portion near the front end of the same. Elongate sliding members 94a and 94b are slidably received in the grooves 92a and 92b so that they are movable from their front or rest positions wherein, as is seen in FIG. 8, they are fully received in the grooves 92a and 92b to their rear or operative positions wherein, as is seen from FIG. 10, they are drawn rearward from the base members 90a and 90b. Although not shown in the drawings, conventional stoppers are arranged in the grooves 92a and 92b to keep the sliding members 94a and 94b at the operative positions. The inboard sides of the sliding members 94a and 94b are respectively formed with straight grooves 96a and 96b, each extending therethrough along the axis thereof. The leading ends of the sliding members 94a and 94b are provided with respective handles 98a and 98b to facilitate the work for drawing of the slider members 94a and 94b from the corresponding base members 90a and 90b. Denoted by numerals 100a and 100b are holes formed at the rear ends of the base members 90a and 90b. The holes catch the handles 98a and 98b when the slider members 94a and 94b are fully received.

When the seat 10C is in its normal condition, the sliding members 94a and 94b are fully received in the base members 90a and 90b and the tray member 54 is held by the holding members 56 and 58, as is seen in FIG. 8.

When a table is required by a rear seat passenger, the sliding members 94a and 94b are drawn from the base members 90a and 90b to assume their operative positions, as shown in FIG. 10, and the tray member 54 is put into the grooves 96a and 96b of the slider members 94a and 94b. With these steps, the tray member 54 can serve as the table. It is to be noted that the base members 90a and 90b in this embodiment serve always as the "armrests" regardless of the condition whether the sliding members 94a and 94b are drawn or not.

Referring to FIGS. 11 and 12, there is shown one 102 of armrest units employed in a fourth embodiment, which is corresponding to the armrest unit 88 of the third embodiment. The armrest unit 102 comprises an elongate base member 104b securely connected at its rear portion to one side of a seatback (not shown). The base member 104b has substantially T-shaped cross section and thus comprises a vertical wall portion 104b-1 and a horizontal flat portion 104b-2 mounted on the vertical wall portion 104b-1. Slidably mounted on the elongate base member 104b is an elongate sliding member 106b. For this mounting, the sliding member 106b has a groove 108b of generally T-shaped cross section into which the upper portion of the base member 104b is slidably inserted. The inboard side of the sliding member 106b is formed with a straight groove 110b which extends from the leading end to a portion near the other end, as shown.

In normal condition of the seat, the sliding member 106b is placed on the base member 104b as shown in FIG. 12. Upon requirement of table setting, the sliding member 106 is drawn rearward from the base member 104b to support the tray member 54.

What is claimed is:

1. A seat comprising:
   a seat cushion portion;

a seatback portion pivotally connected to said seat cushion portion by a seat reclining device;

a pair of armrest units respectively mounted to both sides of said seatback portion, each unit including at least an elongate part which is pivotal relative to said seatback portion between a forward position, wherein the elongate part extends forward of the seatback portion, and a rearward position, wherein the elongate part extends rearward of the seatback portion, each elongate part having a longitudinally extending groove along the inner side thereof;

a tray member having spaced side walls each having an outward projected flange, said tray member being adapted to be supported by the elongate parts when in the rearward position with the flanges thereof slidably received in the respective grooves of the elongate parts; and a tray holder mounted on a back side of said seatback portion for holding said tray member when the same is not in use, said tray holder including a pair of elongate members each having a generally L-shaped cross section, the elongate members being respectively secured to laterally opposed side portions of the back side in such an arrangement that respective elongate channels defined by the elongate members face inwardly toward each other, said tray member being, when not in use, held by said holder with the flanges thereof slidably received in said elongate channels respectively.

2. A seat as claimed in claim 1, in which each armrest unit is pivotally connected to said seatback by pivoting devices comprising:

a circular base plate secured to the seatback, said base plate being formed with a through hole;

a circular stage integrally formed on said base plate to be concentric with the through hole, said stage being formed with an arcuate groove which extends concentrically about the through hole by approximately 180 degrees;

a pivot shaft fixed to one end of each armrest unit; and a guide pin fixed to the armrest unit near the pivot shaft, wherein, upon assembly, said pivot shaft is received in the through hole and the guide pin is received in said arcuate groove.

3. A seat as claimed in claim 2, in which the longitudinal ends of said groove are equipped with rubber blocks respectively, and the middle portion of the groove is equipped with another rubber block.

4. A seat as claimed in claim 1, in which each of said armrest units comprises:

an elongate base member securely connected at one end to one side of said seatback and extending forward from the seatback;

an elongate pivotal member pivotally connected at one end to said one end of said base member through a pivot pin, so that said pivotal member is pivotal from one position wherein said pivotal member is placed on said base member to the other position wherein said pivotal member extends rearward from the seatback, said elongate pivotal member being formed at the inboard side with said groove.

5. A seat as claimed in claim 4, in which said elongate base member is formed at said one end with a projection, and in which said pivotal member is formed with spaced lugs which put therebetween said projection to achieve the pivotal movement of said pivotal member relative to said base member.

6. A seat as claimed in claim 5, further comprising a pair of elements of a fastener, said elements being respectively fixed to said base member and said pivotal member so that upon folding of said pivotal member onto said base member, these two members are fastened.

7. A seat as claimed in claim 1, in which said tray holder comprises:

a pair of elongate members which are respectively mounted to the laterally opposed sides of the back side of said seatback in a manner to extend along the ridges each being defined between the back side of the seatback and one side of the same, each elongate member having a generally L-shaped cross section and being arranged to define between one wall portion of the elongate member and the back side of the seatback a certain clearanace which extends along the ridge and faces toward the other clearance which is defined by the other elongate member, the two clearances being spaced from each other by a distance corresponding to the distance between the two outward flanges of the tray member.

* * * * *